United States Patent
Sasaki et al.

(10) Patent No.: US 9,889,616 B2
(45) Date of Patent: Feb. 13, 2018

(54) SECTOR MOLD, METHOD FOR MANUFACTURING SAME, AND JIG FOR PROCESSING PATTERN BLOCK

(71) Applicant: BRIDGESTONE CORPORATION, Tokyo (JP)

(72) Inventors: Jun Sasaki, Tokyo (JP); Shigeru Hashimoto, Shimonoseki (JP)

(73) Assignee: BRIDGESTONE CORPORATION, Tokyo (JP)

(*) Notice: Subject to any disclaimer, the term of this patent is extended or adjusted under 35 U.S.C. 154(b) by 208 days.

(21) Appl. No.: 14/760,873

(22) PCT Filed: Jan. 21, 2014

(86) PCT No.: PCT/JP2014/051136
§ 371 (c)(1),
(2) Date: Jul. 14, 2015

(87) PCT Pub. No.: WO2014/115731
PCT Pub. Date: Jul. 31, 2014

(65) Prior Publication Data
US 2016/0023414 A1    Jan. 28, 2016

(30) Foreign Application Priority Data
Jan. 24, 2013 (JP) .................. 2013-011381

(51) Int. Cl.
*B29D 30/06* (2006.01)
*B29C 33/30* (2006.01)
(Continued)

(52) U.S. Cl.
CPC .......... *B29D 30/0629* (2013.01); *B29C 33/30* (2013.01); *B29C 37/0053* (2013.01); *B29C 33/424* (2013.01)

(58) Field of Classification Search
CPC    B29D 30/0606; B29D 30/0629; B29C 33/30; B29C 33/306; B29C 33/424; B29C 37/0053; B23Q 3/06
See application file for complete search history.

(56) References Cited

U.S. PATENT DOCUMENTS 1,899,258 A * 2/1933 Bush .................. B29D 30/0606
425/195
3,479,693 A * 11/1969 Cantarutti .......... B29D 30/0629
425/40
(Continued)

FOREIGN PATENT DOCUMENTS

CN    201586882 U    9/2010
DE    2420404    * 11/1975
(Continued)

OTHER PUBLICATIONS

Apr. 22, 2014 International Search Report issued in International Patent Application No. PCT/JP2014/051136.
(Continued)

*Primary Examiner* — James P Mackey
(74) *Attorney, Agent, or Firm* — Oliff PLC

(57) ABSTRACT

A pattern block can be easily attached to a sector with high positional accuracy, and furthermore, the strength thereof is enhanced. The present invention provides a sector mold constituted by attaching a pattern block to a sector, and the sector mold includes: the sector including an embedding groove and holes for positioning pins; and the pattern block including a convex portion for an embedding groove and positioning pins, on a back body surface, corresponding to the embedding groove and the holes for the positioning pins, respectively.

7 Claims, 5 Drawing Sheets

(51) Int. Cl.
*B29C 37/00* (2006.01)
*B29C 33/42* (2006.01)

(56) References Cited

U.S. PATENT DOCUMENTS

| | | | |
|---|---|---|---|
| 4,553,918 A | 11/1985 | Yoda et al. | |
| 4,576,559 A | 3/1986 | Yoda et al. | |
| 4,708,609 A * | 11/1987 | Yoda | B29C 33/10 249/102 |
| 5,234,326 A * | 8/1993 | Galli | B29C 33/10 425/46 |
| 5,340,294 A | 8/1994 | Kata | |
| 6,196,818 B1 | 3/2001 | Coleman et al. | |
| 6,250,901 B1 * | 6/2001 | Nagata | B29C 33/30 425/46 |
| 6,292,993 B1 * | 9/2001 | Ito | B29D 30/0629 29/426.1 |
| 6,382,943 B1 * | 5/2002 | Metz | B29D 30/0606 29/428 |
| 7,670,124 B2 * | 3/2010 | Hyodo | B29D 30/0629 425/46 |
| 2006/0134250 A1 | 6/2006 | Henrotte | |
| 2011/0304082 A1 | 12/2011 | Dusseaux et al. | |

FOREIGN PATENT DOCUMENTS

| | | |
|---|---|---|
| DE | 102010017251 A1 | 12/2011 |
| JP | S52-148576 A | 12/1977 |
| JP | S59-124835 A | 7/1984 |
| JP | S59-124836 A | 7/1984 |
| JP | S59-220345 A | 12/1984 |
| JP | S60-80533 A | 5/1985 |
| JP | H05-16144 A | 1/1993 |
| JP | 2000-263553 A | 9/2000 |
| JP | 2006-175871 A | 7/2006 |
| JP | 2012-512071 A | 5/2012 |

OTHER PUBLICATIONS

Aug. 17, 2016 Search Report issued in European Patent Application No. 14742776.9.

* cited by examiner

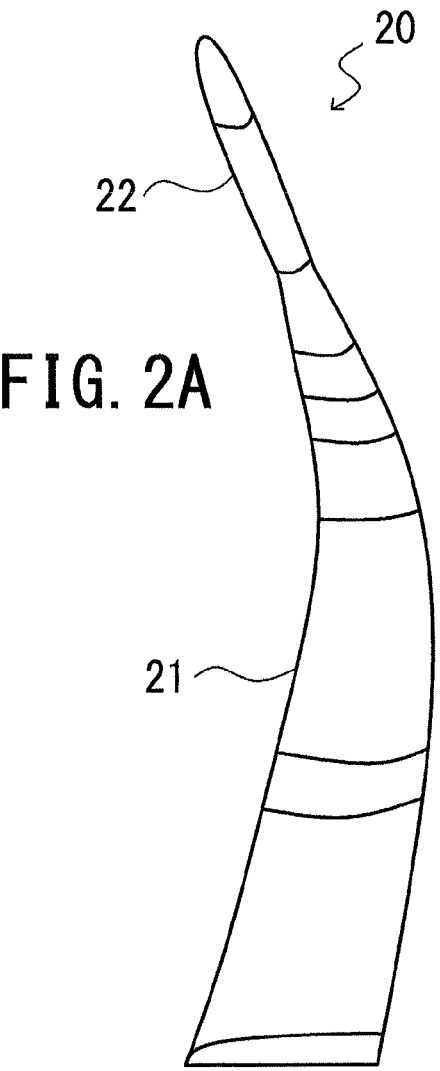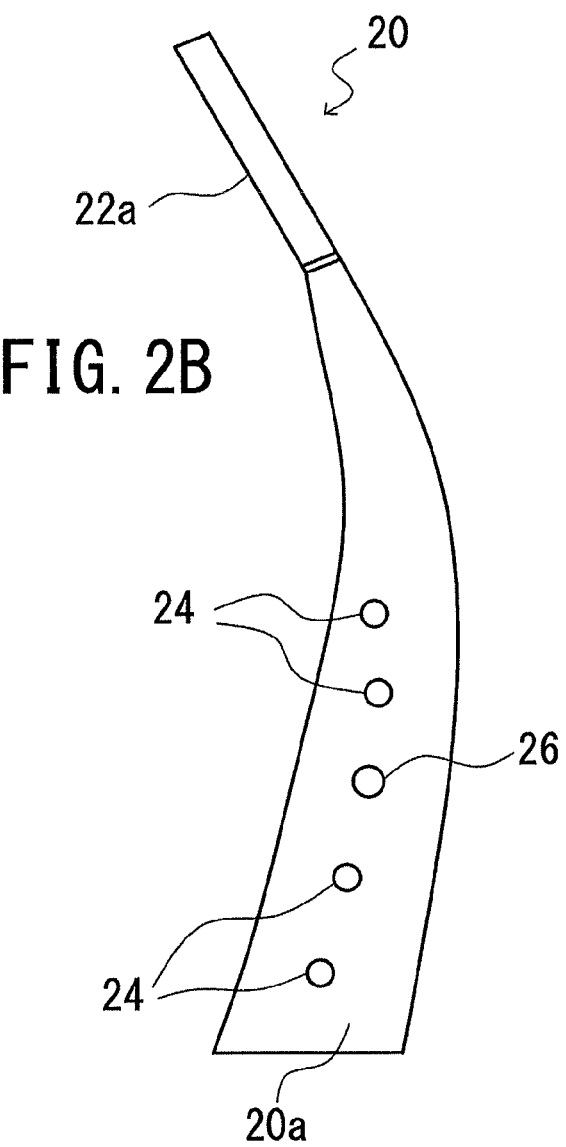

SECTOR MOLD, METHOD FOR MANUFACTURING SAME, AND JIG FOR PROCESSING PATTERN BLOCK

TECHNICAL FIELD

The present invention relates to a sector mold, a method for manufacturing the same, and a jig for processing a pattern block.

BACKGROUND ART

In general, a tire-vulcanizing mold includes a pair of side plates for forming a side wall portion of a pneumatic tire, a pair of bead rings for forming a bead portion, and a sector mold for integrally forming a tread portion and both shoulder portions. The sector mold is separated into a plurality of sectors, and is annularly disposed around the tread portion of an unvulcanized pneumatic tire.

There are formed, on a tread forming surface of each of the sectors, for example, a main-groove forming bone for forming a main groove extending in a circumferential direction of a tire; a lug-groove forming bone for forming a lug groove extending in a width direction of the tire at the shoulder portion; a slant-groove forming bone for forming aslant groove slanted with respect to the circumferential direction of the tire at the shoulder portion and a center portion; and the like. Patterns of these groove forming bones on the sectors are formed through carving processing independently of the sectors, and are attached to each of the sectors as pattern blocks subjected to carving processing.

Incidentally, conventionally, patterns for forming the lug groove are mainly used as patterns of the pattern block. However, in recent years, in response to the requirements for tire performance, there has been an increasing tendency to include a narrow-groove forming bone.

Conventionally, carving processing on the pattern block is performed in a state where an entire periphery of the pattern block is fixed to a jig for pattern carving (hereinafter, simply referred to as a jig) through welding so as not to be misaligned. Therefore, in the case where the narrow-groove forming bone is fixed through welding, the entire periphery thereof has to be fixed through welding by setting a welding margin with which fixation strength for the narrow-groove forming bone can be ensured.

However, when the entire periphery of the pattern block is fixed to the jig through welding, there exists a problem in which a considerable number of processes become necessary in order to detach the pattern block from the jig. In addition, distortion is also likely to occur in the pattern block due to heat generated by welding fixation. In particular, in the case where the narrow-groove forming bone for the tire is formed, chattering or welding distortion generated during processing easily leads to reducing accuracy of processing. Furthermore, when chattering or welding distortion is generated during processing of the pattern block, it becomes necessary to correct warpage or bending at the time of attaching the pattern block to the sector after the processing.

Moreover, conventionally, when the pattern block is attached to the sector, a position of the pattern block is temporarily fixed by a bolt, and attachment positioning is performed while fine adjustment is being performed along a marking line drawn in advance on the sector. However, the positioning accuracy in the circumferential direction by using marking is not so good.

In addition, after a back body surface of the pattern block is machine-processed in accordance with a shape of a tread (sector face) of the sector, the pattern block is attached to the sector. Recently, an accuracy of machine processing of the back body surface of the pattern block is enhanced, therefore, an accuracy capable of being attached to the sector face without performing further machine-processing can be obtained. However, even if machine processing is performed with high accuracy, it is difficult to maintain the accuracy of machine processing, due to distortion or warpage or the like generated during the carving processing of the pattern block after the machine processing. Therefore, attachment is performed while a lapping operation is being performed between the back body surface of the pattern block and the sector face, but attachment of the pattern block to the sector is complicated and requires manual work. Furthermore, as to the lapping operation, since it is difficult to apply lapping to an entire surface, a clearance part is provided on a part of the back body surface, with the result that the lapping operation is performed so as to reduce a range (area) of lapping with respect to the tread of the sector. However, despite that, the complicated procedures are not sufficiently eliminated.

In contrast to this, for example, Patent Literature 1 describes a method of manufacturing a pattern block made of a steel plate in order to prevent generation of distortion in the case of welding the pattern block to a holder.

In this method, the steel plate is subjected to fusion cutting and then to rough machining. Subsequently, a clearance part is formed on a back surface of the holder (sector), the pattern block is formed, and the pattern block is welded to the holder. With this method, the distortion due to welding is less likely to be generated as compared with a case where the pattern block is formed through casting. However, in the first place, formation of the pattern block through casting is not an object of the method.

Patent Literature 2 describes that a rib of a connection bone portion (pattern block) formed by the rib and a lug is attached to a mold body (sector) by using an attachment bolt. However, with this attachment method, since a bottom surface of the pattern block is merely placed on the sector, there is a problem of not being capable of strengthening rigidity of the pattern block in addition to a problem of positional accuracy. Accordingly, in order to secure the strength, there is no other choice but to weld and fix the pattern block along an outer shape thereof, and thus man-hour is unavoidably increased.

In Patent Literature 3, a fixing portion formed at both ends of each piece (pattern block) is fitted into a fitting groove of a block (sector) to thereby attach each piece to the block in a fitted manner. With this configuration, fixing is not performed using fastening means, unlike conventional techniques.

However, this method involves a complicated processing of forming the fitting groove of the block.

CITATION LIST

Patent Literature

PTL 1: Japanese Patent Laid-Open No. 60-80533
PTL 2: Japanese Patent Laid-Open No. 59-124835
PTL 3: Japanese Patent Laid-Open No. 05-16144

SUMMARY OF INVENTION

Technical Problem

The present invention has been made in view of the above-described prior-art problems in manufacturing a vulcanizing mold, and an object of the present invention is to make it possible for a pattern block to be easily attached to a sector with high positional accuracy, and furthermore, is to enhance the strength thereof.

Solution to Problem

The present invention provides a sector mold constituted by attaching a pattern block to a sector, and the sector mold includes: the sector including an embedding groove and holes for positioning pins; and the pattern block including a convex portion for the embedding groove and the positioning pins, on a back body surface, corresponding to the embedding groove and the holes for the positioning pins, respectively.

Another invention according to the present application provides a method for manufacturing a sector mold in which a pattern block is attached to a sector, and the method includes the steps of: providing an embedding groove and holes for positioning pins on a sector; providing, on a back body surface of the pattern block, a convex portion for the embedding groove and the positioning pins corresponding to the embedding groove and the holes for the positioning pins; and fitting the convex portion for the embedding groove and the positioning pins, which are provided on the back body surface of the pattern block, into the embedding groove and the holes for positioning pins on the sector to thereby attach the pattern block to the sector.

Advantageous Effects of Invention

According to the present invention, the pattern block can be easily attached to the sector with high positional accuracy, and furthermore, the strength thereof can be enhanced.

BRIEF DESCRIPTION OF DRAWINGS

FIG. 2A is an elevation view illustrating a pattern block, and FIG. 2B is a back side view illustrating a back body surface of the pattern block.

DESCRIPTION OF EMBODIMENTS

An embodiment of a sector mold according to the present invention will be described.

Figure 1A:
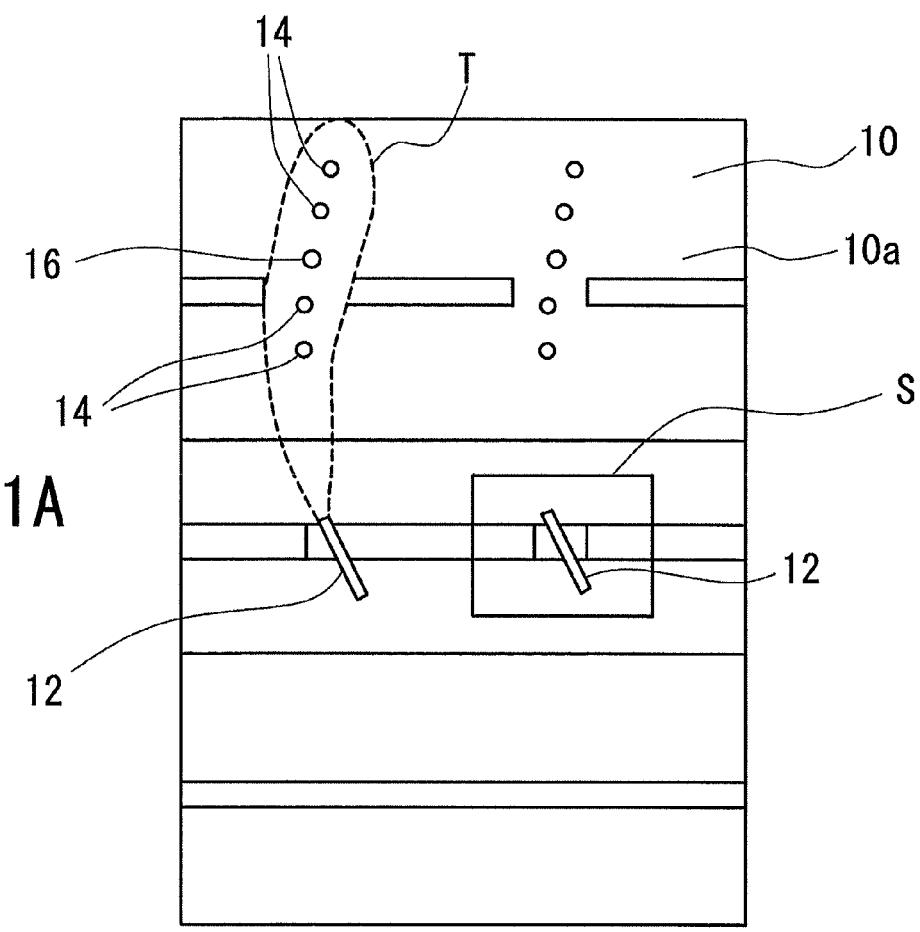
FIG. 1A is an elevation view illustrating a sector.
Figure 1B:
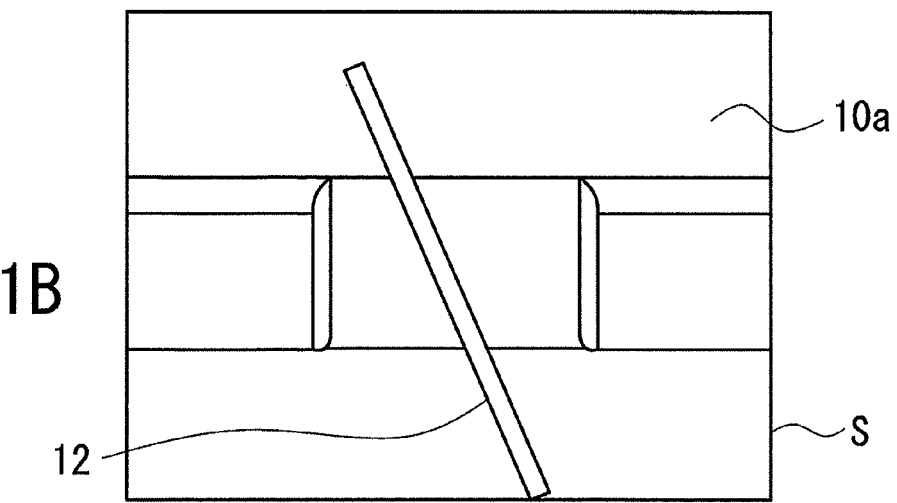
FIG. 1B is an enlarged view illustrating a detailed structure of a portion surrounded by a rectangle in FIG. 1A.

FIG. 1A is an elevation view illustrating a sector 10, and FIG. 1B is an enlarged view illustrating a detailed structure of a portion S surrounded by a rectangle in FIG. 1A.

As with a conventional technique, a sector mold according to the present embodiment is formed such that a plurality of sectors 10 constituting a tire tread portion and a pattern block 20 (FIG. 2) serving as a bone of each of the sectors 10 are separately manufactured and the pattern block 20 subjected to carving processing is attached to the sector 10.

However, unlike a conventional sector, there are provided, on a surface of the sector 10 according to the present embodiment, an embedding groove 12 hollowed in accordance with a shape of a part (narrow-groove forming bone in this case) of an outer shape of the pattern block 20 as illustrated in the drawing, holes 14 for positioning pins, and a bolt inserting hole 16 for fixing the pattern block 20 from an outer shape portion of the sector 10. Note that, in the drawing, a broken line T indicates an attachment position of the pattern block 20.

FIG. 1B is an enlarged view illustrating a detailed structure of a portion S surrounded by a rectangle in FIG. 1A, and illustrating the embedding groove 12 provided on the sector 10 in an enlarged manner.

FIG. 2A is an elevation view illustrating the pattern block 20 attached to the sector 10 in FIG. 1, and FIG. 2B is a back side view illustrating a back body surface 20a of the pattern block.

The pattern block 20 includes a lug-groove forming bone for a tire having a relatively wider width, and a narrow-groove forming bone 22 connecting to the lug-groove forming bone 21 and having a width narrower than the lug-groove forming bone 21. Furthermore, a circumferential narrow-groove forming bone 18 (FIG. 5) for forming a narrow groove extending in a circumferential direction of the tire is integrally formed with the lug-groove forming bone 21.

The back body surface 20a of the pattern block 20 is machine-processed in accordance with a shape of a tread (sector face) of the sector 10 as with the conventional technique. Furthermore, a convex portion 22a for an embedding groove and a plurality of positioning pins 24 are formed corresponding to the embedding groove 12 and the holes 14 for the positioning pins of the sector 10 illustrated in FIG. 1. Namely, the embedding groove 12 and the convex portion 22a for the embedding groove, as well as the holes 14 for the positioning pins and the positioning pins 24, which are fitted into the holes 14 for the positioning pins, are each formed so as to have a size and a position with which they are fitted into each other.

Here, the embedding groove 12 is formed on a sector face 10a, and the convex portion 22a for the embedding groove is formed on the back body surface 20a of the pattern block 20, by machine-processing the sector face 10a (FIG. 1) and the back body surface 20a of the pattern block 20 by an arbitrary means such as a cutting device. Furthermore, each of the positioning pins 24, which is separately created, is attached to the pattern block 20 by implanting or welding or the like. Moreover, the pattern block 20 is provided with a bolt hole 26 having a thread groove for fixing the pattern block 20 to the sector 10.

Next, the carving processing on the pattern block 20 having the structure described above will be described.

Figure 3:
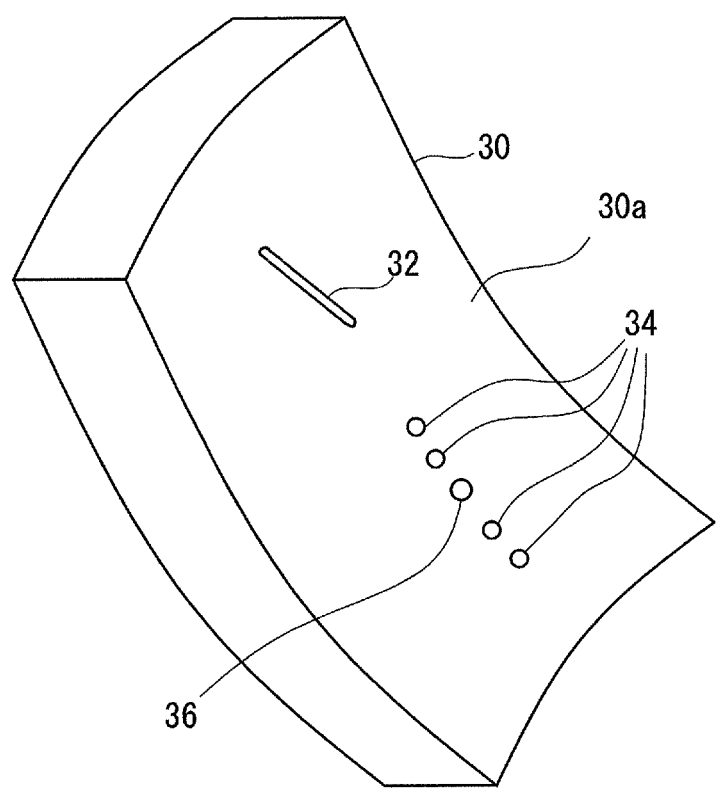
FIG. 3 is a perspective view illustrating a jig for pattern-carving processing used in carving processing on the pattern block.

FIG. 3 is a perspective view illustrating a jig for pattern-carving processing (hereinafter, simply referred to as a jig), the jig being used for performing carving processing on the pattern block 20.

As illustrated in the drawing, a surface 30a of a jig 30 is machine-processed into the same three-dimensional shape as the sector face 10a (FIG. 1) of the sector 10. There are provided, on the surface 30a, an embedding groove 32 having the same shape as the sector 10, holes 34 for the positioning pins, and a bolt inserting hole 36 for fixing which have the same arrangement thereas.

At the time of carving processing on the pattern block 20, the convex portion 22a for the embedding groove and the plurality of positioning pins 24 on the back body surface 20a of the pattern block 20 are inserted into the embedding groove 32 and the holes 34 for the positioning pins of the jig 30. After that, a fixing bolt 15 is inserted from a back side of the jig 30 through the bolt inserting hole 36, and is fastened by screwing into the above-described bolt hole 26 of the pattern block 20.

In the present embodiment, since the back body surface 20a of the pattern block 20 and the surface of the jig 30 are machine-processed in accordance with the shape of the sector face of the sector 10, the jig 30 and the pattern block 20 are closely and integrally fixed. Therefore, rigidity of the pattern block 20 subject to be processed is increased, and it is possible to suppress processing defect such as chattering or warpage of the pattern block 20 due to cutting resistance applied from a processing tool or heat, with the result that it is possible to obtain a surface having a favorable processing finish. Furthermore, it is possible to maintain accuracy of machine processing of the back body surface 20a of the pattern block 20.

Figure 4:
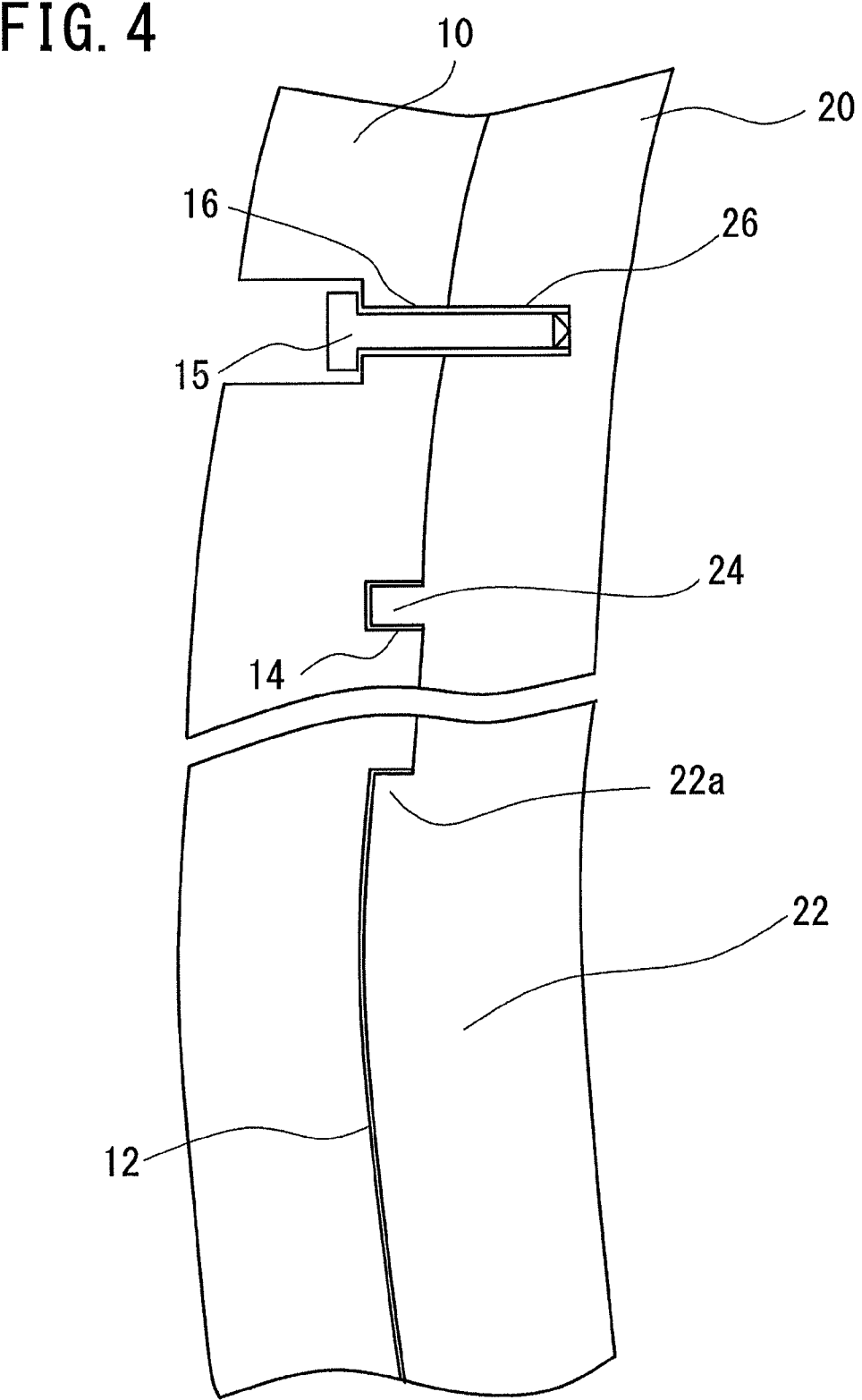
FIG. 4 is a cross-sectional view illustrating a state where the pattern block is attached to a sector face of the sector.

FIG. 4 is a cross-sectional view, taken along a longitudinal direction of the'pattern block 20, illustrating a state where the pattern block 20 subjected to carving processing illustrated in FIG. 2 is attached to the sector face 10a of the sector 10.

In order to attach the pattern block 20, which has been processed, to the sector 10, the positioning pins 24 of the pattern block 20 are fitted into the holes 14 for the positioning pins of the sector 10 as illustrated in FIG. 4 by using, as a guide, the convex portion 22a for the embedding groove on the pattern block 20, the pattern block 20 is combined with the embedding groove 12 provided on the sector 10, and the fixing bolt 15 is inserted and screwed into the bolt hole 26 of the pattern block 20 from an outer peripheral surface of the sector 10 through the bolt hole 16, with the result that the pattern block 20 and the sector 10 are integrally fixed.

Note that the embedding groove 12 may be provided only on the narrow-groove forming bone 22 having small rigidity as illustrated in the drawing, depending on required bone strength and fixation strength, or, the embedding groove 12 may be provided on a part of or an entire periphery of the outer shape of the pattern block 20. Naturally, this is also applied to the embedding groove 32 of the jig 30.

Figure 5:
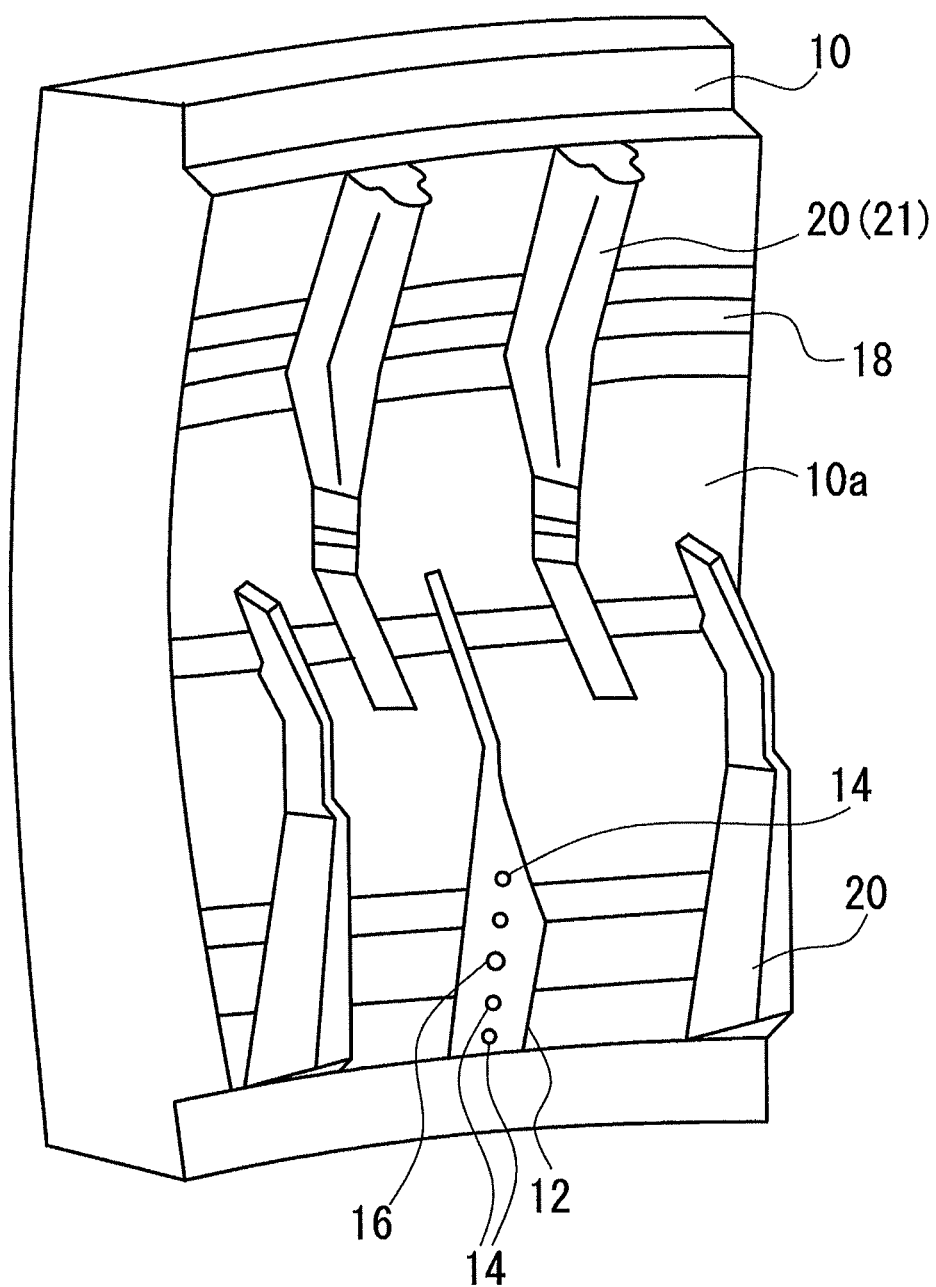
FIG. 5 is a perspective view illustrating the pattern block in a state of being fixed to the sector face.

FIG. 5 is a perspective view illustrating the pattern block 20 in a state of being fixed to the sector face 10a with the fixing bolt 15. In this illustrated example, embedding and fixing four pattern blocks 20 are already completed, and one pattern block 20 is yet to be attached. Here, a yet-to-be-attached embedding groove 12 is formed as a groove for embedding the entire pattern block 20. As described above, in the case where the entire pattern block 20 is embedded in the sector face 10a, the strength of the pattern block 20 is further increased.

In the drawing, a reference sign "18" represents the circumferential narrow-groove forming bone 18. In the case where the circumferential narrow-groove forming bone 18 is provided on the pattern block 20 as described above, the pattern block 20 is divided at a portion of this circumferential narrow-groove forming bone 18, and the portion of the circumferential narrow-groove'forming bone 18 is welded and fixed. With this configuration, it is possible to reinforce the strength of the circumferential narrow-groove forming bone 18, and furthermore, to easily carry out a lapping operation after the welding.

Namely, the connecting portion of the lug-groove forming bone 21 and the circumferential narrow-groove forming bone 18 of the pattern block 20 is formed into an R-shape for the purpose of stress relaxation of the tire. Therefore, when the pattern block 20 is divided at the connecting portion, this R-shape is required to be formed with build-up welding when sectors 10 are joined, and therefore, further machine processing may be required.

In contrast to this, when the pattern block 20 is divided at the portion of the circumferential narrow-groove forming bone 18 as with the present embodiment, the connecting portion of the groove forming bone, where welding and fixing are necessary, is limited to the portion of the circumferential narrow-groove forming bone 18, and thus it is sufficient that circumferential narrow-groove forming bones 18 are simply welded and fixed to each other, with the result that a lapping operation after the welding can be easily carried out.

As illustrated in FIG. 5, after the pattern block 20 is fixed to the sector 10 by using the fixing bolt 15, an air groove (vent groove), which is provided, along a joining line between the sector 10 and the pattern block 20, for the purpose of preventing the generation of bare, is manually chiseled and caulked, or a gap is filled by welding, and finishing processing is performed, with the result that the sector 10 is completed. In addition, a sector mold is constituted by annularly disposing the sectors 10.

Note that, as described above, in the case of a conventional structure having no embedding groove, the pattern block 20 is attached in a manner such that the pattern block 20 is temporarily fixed to the sector 10, and is fixed while fine adjustment is being made by using, as a guide, a marking line drawn in advance at an attachment target position for the pattern block 20. However, with this fixing method, the pattern block 20 is merely placed on the sector face 10a, and the pattern block 20 is not reinforced with the sector face 10a, thereby leading to low rigidity. Therefore, in order to secure strength against demolding at the time of manufacturing a tire (at the time of vulcanization), there is no other choice but to weld and fix the pattern block 20 to the sector face 10a along the outer shape of the pattern block 20.

In contrast to this, according to the present embodiment, it is possible to correctly perform positioning and at the same time, to increase rigidity thereof, only by fitting the pattern block 20 into the embedding groove 12. In particular, the pattern block 20 can be fixed to the jig 30 by using the fixing bolt 15, which makes it easy to perform finishing processing on the pattern block 20 after the fixing as compared with the case of performing fixing through welding.

In fixing the pattern block 20 to the sector 10, as described above, the back body surface 20a of the pattern block 20 subjected to machine processing in accordance with the shape of the sector face 10a does not have distortion or warpage generated therein during pattern-carving processing, and maintains accuracy of machine processing, with the result that it is not necessary to perform a lapping processing on the back body surface 20a of the pattern block 20, unlike a conventional technique.

Note that a constituent material of the pattern block 20 may be the same material as the sector 10. However, if a material having thermal expansion larger than a constituent material of the sector 10 is selected, a gap between the embedding groove 12 on the sector 10 side and the convex portion 22a for the embedding groove on the back body surface 20a of the pattern block 20 is reduced by utilizing a difference in thermal expansion during vulcanization, namely, due to fitting caused by thermal expansion, with the result that it is possible to increase fixation strength of the pattern block 20.

As described above, there have been described the sector mold, a method for manufacturing the sector mold, and the jig for manufacturing the sector mold according to the present embodiment. According to the present embodiment, the following effects can be obtained.

(1) At the time of attaching a block to the sector 10, it is possible to enhance positioning accuracy as compared with a conventional pattern block, and at the same time, to enhance fixation strength, by simply fitting the embedding groove 12 of the sector 10 and the positioning pins 24 to the convex portion 22a for the embedding groove and the positioning pins 24 on the back body surface 20a of the pattern block 20.

Furthermore, since it is possible to minimize welding operation, distortion or warpage caused by welding can be suppressed, and fixing operation of the pattern block 20 to the sector 10 can be easily performed.

(2) At the time of attaching the pattern block 20 to the sector 10, it is possible to easily perform positioning by using the embedding groove 12 and the convex portion 22a for the embedding groove as a guide for attachment.

(3) It is possible to attach the back body surface 20a of the pattern block 20 to the sector face 10a of the sector 10 without performing lapping between the back body surface 20a and the sector face 10a. Furthermore, there is no gap at the connecting portion between the sector 10 and the pattern block 20, and thus it is possible to obtain a favorable mold shape and product surface.

(4) In the case where the circumferential narrow-groove forming bone 18 is connected to the lug-groove forming bone 21 of the pattern block 20, the strength of the circumferential narrow-groove forming bone 18 can be reinforced and a lapping operation after the welding can be easily carried out, by dividing the pattern block 20 at the portion of the circumferential narrow-groove forming bone 18 and by welding and fixing the circumferential narrow-groove forming bone 18.

(5) It is possible to enhance a fixation property to the jig and positioning accuracy of the pattern block 20, by switching to fixing only with a bolt from a back surface (back body surface) and providing the positioning pins 24, without performing welding and fixing to the jig at the time of pattern carving unlike a conventional technique.

(6) The embedding groove 32 is provided on the jig 30 side, and the convex portion 22a for the embedding groove, which corresponds to the embedding groove 32, is provided on the back body surface 20a of the pattern block 20, with the result that the fixation property and the positioning accuracy of the pattern block 20 are enhanced. Furthermore, it is possible to suppress processing defect without causing chattering or warpage by welding distortion. Note that it is possible to obtain a favorable finishing surface only by providing the embedding groove 32 for the narrow-groove forming bone 22, in the jig 30.

(7) The sector 10 is manufactured separately from the pattern block 20, and thus it is possible to eliminate a critical path of processes (serial processes), with the result that the degree of freedom in process design can be increased and a processing period can be shortened.

REFERENCE SIGNS LIST

10 . . . sector
10a . . . sector face
12 . . . embedding groove
14 . . . hole for a positioning pin
15 . . . fixing bolt
16 . . . bolt inserting hole
18 . . . circumferential narrow-groove forming bone
20 . . . pattern block
20a . . . back body surface
21 . . . lug-groove forming bone
22 . . . narrow-groove forming bone
22a . . . convex portion for an embedding groove
24 . . . positioning pin
26 . . . bolt hole
30 . . . jig
32 . . . embedding groove
34 . . . hole for a positioning pin
36 . . . bolt inserting hole

The invention claimed is:

1. A sector mold constituted by attaching a pattern block to a sector, comprising:
    the sector including an embedding groove and holes for positioning pins; and
    the pattern block including a convex portion for the embedding groove and the positioning pins, on a back body surface, corresponding to the embedding groove and the holes for the positioning pins, respectively, wherein
    the pattern block includes a lug-groove forming bone and a circumferential narrow-groove forming bone connected to the lug-groove forming bone, and
    the pattern block is divided at a portion of the circumferential narrow-groove forming bone.

2. The sector mold according to claim 1, wherein
    the sector has a bolt inserting hole through which a fixing bolt is inserted, and
    the pattern block has a bolt hole with which the fixing bolt engages.

3. The sector mold according to claim 1, wherein
    the pattern block is constituted of a material having thermal expansion larger than a material of the sector.

4. The sector mold according to claim 2, wherein
    the bolt hole is provided between the positioning pins, and
    the bolt inserting hole is provided between the holes for the positioning pins.

5. The sector mold according to claim 1, wherein
    divided pattern blocks are welded and fixed only at the portion of the circumferential narrow-groove forming bone by welding and fixing the circumferential narrow-groove forming bone to each other.

6. A method for manufacturing a sector mold in which a pattern block is attached to a sector, the method comprising the steps of:
    providing an embedding groove and holes for positioning pins on the sector;
    providing, on a back body surface of the pattern block including a lug-groove forming bone and a circumferential narrow-groove forming bone connected to the lug-groove forming bone, and divided at a portion of the circumferential narrow-groove forming bone, a convex portion for the embedding groove and the positioning pins corresponding to the embedding groove and the holes for the positioning pins, respectively; and
    fitting the convex portion for the embedding groove and the positioning pins, which are provided on the back body surface of the pattern block, into the embedding groove and the holes for the positioning pins on the sector to thereby attach the pattern block to the sector.

7. The method for manufacturing a sector mold according to claim 6, the method further comprising the steps of:
    providing, on a jig for processing a pattern block, a jig embedding groove and jig holes for the positioning pins corresponding to the convex portion for the embedding groove and the positioning pins of the pattern block, respectively;

fitting the convex portion for the embedding groove and the positioning pins of the pattern block into the jig embedding groove and the jig holes for the positioning pins to thereby attach the pattern block to the jig for processing; and performing pattern-carving processing on the attached pattern block.

* * * * *